United States Patent [19]

Rietsch, Jr.

[11] Patent Number: 4,864,936

[45] Date of Patent: Sep. 12, 1989

[54] AUTO CONVEYOR WITH IMPROVED ROLLER ASSEMBLY

[75] Inventor: Gilbert J. Rietsch, Jr., Rochester, Mich.

[73] Assignee: Peco Corporation, Troy, Mich.

[21] Appl. No.: 229,248

[22] Filed: Aug. 8, 1988

[51] Int. Cl.⁴ ............................................. B61B 13/00
[52] U.S. Cl. ............................. 104/172.1; 104/172.3; 198/732
[58] Field of Search .................... 198/732; 104/172.3, 104/172.5, 172.1

[56] References Cited

U.S. PATENT DOCUMENTS

| | | | |
|---|---|---|---|
| 1,965,056 | 7/1934 | Rieke | 198/732 X |
| 3,693,392 | 9/1972 | Watson | 104/172.3 |
| 3,724,390 | 4/1973 | Beer et al. | 104/172.3 |

Primary Examiner—Robert B. Reeves
Assistant Examiner—Dean J. Kramer
Attorney, Agent, or Firm—John R. Benefiel

[57] ABSTRACT

An auto conveyor is disclosed of type in which chain driven pusher rollers engage a vehicle tire running along a track, while guide rollers support the pusher rollers above the guide track. A low profile, guide-pusher roller assembly is provided configured to avoid contact of the tire with the guide roller in which the pusher rollers are constituted by large diameter sleeves are rotated on a stationary sleeve, and smaller diameter guide rollers are mounted on either end of an axle shaft passing within the diameter of the sleeve. The guide roller perimeters protrude below the perimeter of the pusher rollers to support each pusher roller above the guide track.

20 Claims, 3 Drawing Sheets

AUTO CONVEYOR WITH IMPROVED ROLLER ASSEMBLY

FIELD OF THE INVENTION

This invention concerns conveyors, and more particularly auto conveyors of the type having a series of roller assemblies attached at spaced points along a conveyor chain, each roller assembly including a set of pusher rollers which engage the front or rear tires of a conveyed auto, pushing it along a guide track.

BACKGROUND OF THE INVENTION

Car washes utilize auto conveyors having rollers carried by a chain each of which are selectively positioned to engage a tire of a vehicle to push the vehicle along the track and through the car wash.

In many widely used designs, a plurality of spaced roller assemblies are secured along the length of an endless conveyor chain, which chain extends below but along the path of travel of the auto.

Each roller assembly includes a set of outboard guide rollers which ride along an upper track and also an inboard set of pusher rollers which move against the auto tire when in the engaging position. The roller sets are each mounted on a roller support arm which extends downwardly through a slot in the track to the chain running below.

In U.S. Pat. Re No. 30,026, describing such a design, each of the guide rollers and pusher rollers are mounted on a common axis for independent rotation. The guide rollers are necessarily of larger diameter than the pusher rollers to support the pusher roller above the surface of the track and allow free rotation of the pusher rollers with rotation of the vehicle tire.

This approach has created problems when a conveyed auto is equipped with wide tires, which sometimes will engage one or both of the guide rollers, causing the guide rollers to be dragged along the track. This condition leads to greatly increase drag, as well as early wear out and failure of the rollers and/or the track. Another problem is encountered in that the smaller diameter pusher rollers sometimes slip beneath the tires so that the auto escapes its driving connection with the chain. These small diameter rollers are subject to early wearout due to the excessive number of revolutions experienced by the roller, and being constructed of steel, can wear out the guide track or well.

U.S. Pat. No. 4,374,496 describes roller assemblies incorporating parallel axis sets of guide and pusher rollers mounted above and below each other, to obviate the wide tire problem. This design leads to other problems, and does not completely solve the problem of eliminating drag of the guide rollers. Specifically, the high profile of this design, while purportedly improving the mechanical advantage, can cause tangling with tire washing mechanisms. If smaller diameter rollers are used to lower the profile, the smaller diameter of the rollers causes an excessive number of revolutions and early wearout.

In this design, as the roller assembly tilts under load, both roller sets approach tangency with the tire periphery, and again results in the tire engaging both sets of rollers, causing dragging of the guide rollers and their early failure.

The high profile of the stacked set of rollers creates a high center of gravity and greater resistance to being pulled through a trap door covering the point of entrance, Also, the guide rollers lead the pusher rollers so that the center of gravity is somewhat forward, even though the roller arm is tilted rearwardly. These factors combine to increase the tendency of the rollers to catapult as the roller moves through the entrance door, flipping to a tilted forward position rather than a tilted back, normal position.

In the tilted forward position, the lowered profile of the roller sometimes causes submarining of the rollers under the tire or lurching of the vehicle as the rollers flip back, both undersirable occurrences.

Other similar problems have been encountered with this design, i.e., tire contact with the roller support member, and dragging of the chain on the rollers during the return leg of the chain travel, as well as end wear on the rollers if the chain is pulling to either side.

In the design shown in U.S. Pat. Re. No. 30,026, the on-demand engagement feature is provided by a pivoting ramp which guides the rollers upward from a non-engaging level beneath the track through the trap door cover.

The ramps are pivoted by a power cylinder running parallel to the ramp and require a linkage system to pivot the ramps, which linkage system develops looseness, again leading to early failure. Misalignment and jamming of the rollers at the entrance door can also result from the ramps being improperly located.

Accordingly, it is an object of the present invention to provide an auto conveyor of the type described in which contact of a vehicle tire with the guide rollers is reliably prevented, and at the same time the roller assembly is of low profile to minimize the possibility of entanglement with tire washers.

Another object of the present invention is to provide an auto conveyor having a roller assembly which is not subject to early wear out, runs smoothly, and eliminates the tendency to catapult and reverse the rollers.

It is yet another object to provide an auto conveyor of the type described in which the pivoting of the ramp arms is actuated by a simple and reliable mechanism which minimizes the development of looseness and misalignments.

SUMMARY OF THE INVENTION

These and other objects of the present invention are achieved by an arrangement of sets of guide rollers and pusher rollers which are mounted for rotation about off set parallel axes, but the guide rollers revolving on an axis of rotation eccentric to the pusher roller axis. The guide roller axis lies within the perimeter of the pusher roller, while the guide roller perimeter protrudes below that of the pusher roller, enabling elevated support of the pusher rollers on the guide track by the guide rollers running on the guide track.

In the design disclosed, the pusher rollers comprise sleeves of a bearing material mounted on a large diameter cylindrical sleeve fixed to one end of the roller arm. A pair of bushings are received in either end of the cylindrical sleeve, and each have a through bore formed therein located substantially off axis to the center of the sleeve. An easily removable axle shaft passes through each of the bores and each protruding end revolvably mounts a guide roller of a relatively small diameter, also constructed of a bearing material. As noted, the periphery of the guide roller protrudes well below the perimeter of the pusher roller due to its eccentric location, supporting the pusher roller well above the track surface.

The eccentric axis relationship of the pusher and guide rollers results in a low profile assembly, out of the way of tire cleaners, and reliably avoiding contact of the tire with the guide rollers.

The guide rollers each trail the respective associated pusher roller, so that the token with the low profile configuration, the tendency of the roller to catapult when passing through the entrance door is greatly minimized.

The large diameter of the pusher rollers achieves stable tracking and reliable tire engagement, and reduces wear due to the resulting reduction in the number of revolutions.

The roller arm is angled to prevent contact with the tire, and a deflector segment is welded intermediate the length of the cylindrical sleeve to prevent chain contact with the pusher rollers.

A directly-coupled drive connection is provided between a linear to rotary actuator to enable pivoting of the ramps elevating the guide and pusher roller sets on demand, greatly minimizing looseness and roller jamming as well as the resultant failures.

The non-engaging track level is lined with high density plastic angles engaging the ends of the guide rollers to maintain true tracking in their travel along the lower level, when idling and not engaged with a vehicle tire.

DESCRIPTION OF THE DRAWING VIEWS

DETAILED DESCRIPTION

Figure 1:
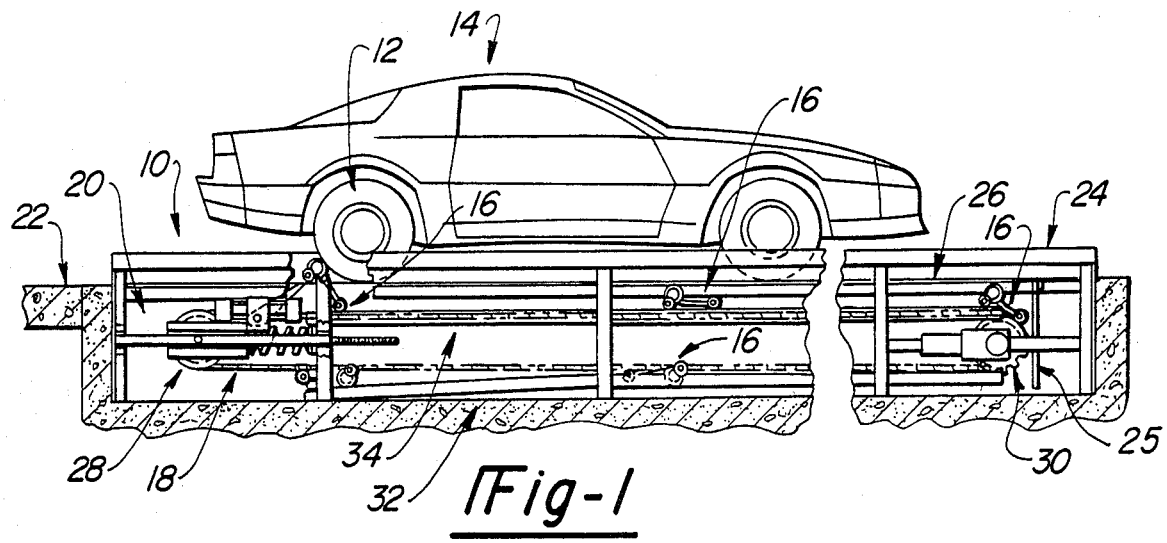
FIG. 1 is a fragmentary side elevational view of a complete conveyor according to the present invention.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the Drawings and more particularly FIGS. 1-4, the improved auto conveyor 10 according to the present invention is adapted to engage one of the front or rear tires 12 of an auto 14 with one of a plurality of roller assemblies 16 connected to an endless chain 18 at spaced intervals. The chain 18 extends along but below the intended path of the conveyed auto 14, the conveyor 10 typically being recessed into a pit area 20 below the level of the concrete approach 22. A welded steel framework 24, supports a guide track 26 along which the auto 14 is conveyed, and a front spring tensioned drum 28 and a rear power driven sprocket 30 each receive the chain 18.

The chain 18 circulates to carry the roller assemblies 16 along a lower return guide track 32 and an intermediate guide track 34 for each roller assembly 16 not in engagement with the auto tires 12. The roller assemblies 16 are selectively caused to pass up from the intermediate guide track 34 to run along the guide track 26 and engage the vehicle tires 12, and at all other times running along the intermediate guide track 34 in a non tire engaging position.

The roller assemblies 16 are in an upright position when running along guide track 26, but may swing down to run in a generally horizontal position when returning along return guide track 32. This creates a tendency to flip over after passing around sprocket 30.

A flexible rubber baffle sheet 25 is suspended along the upper edge closely adjacent the drive sprocket 30 so as to be engaged by the roller assemblies 16, giving way but resisting any tendency for the roller assemblies to flip over. This was previously accomplished with curved fenders, which were costly to manufacture and had a tendency to accumulate dirt.

Figure 2:
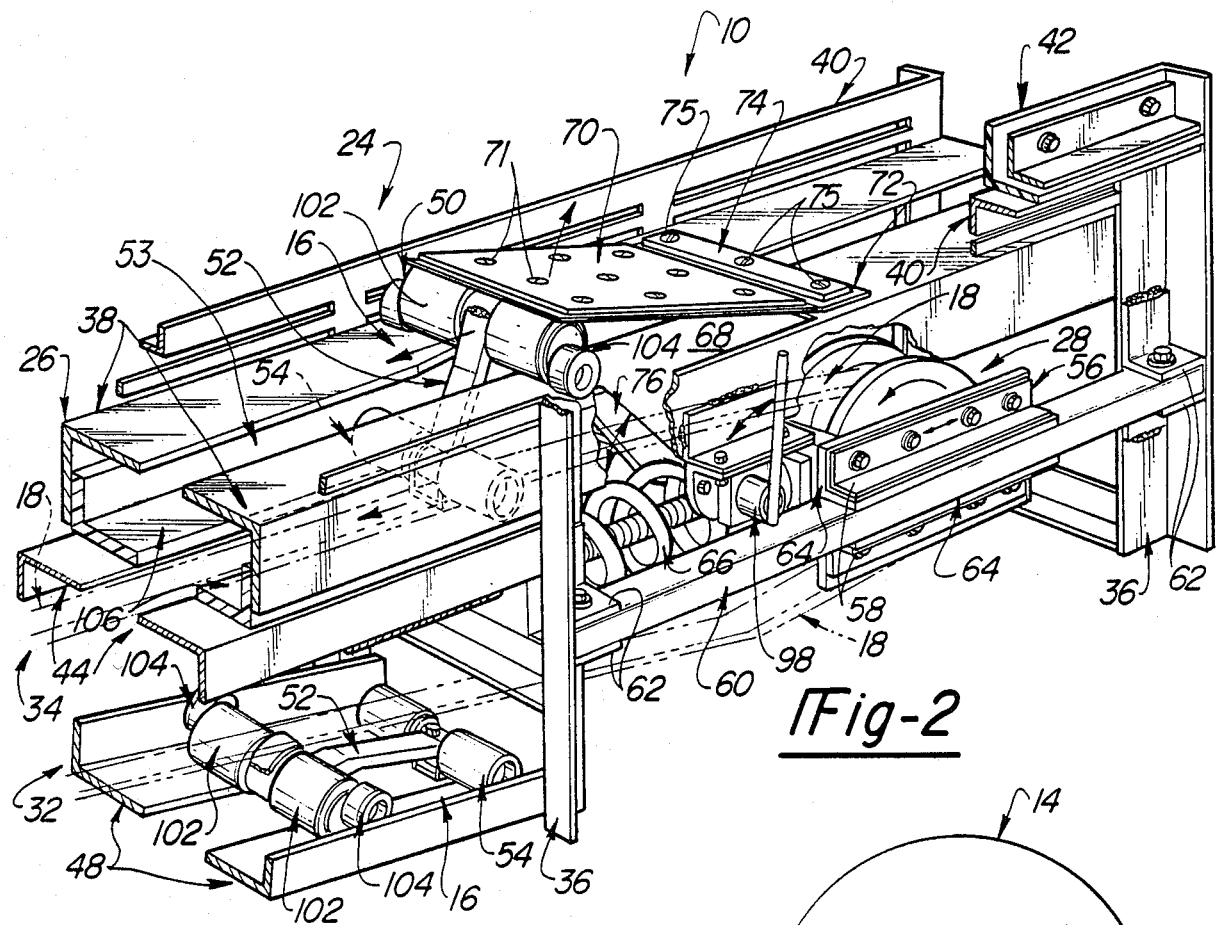
FIG. 2 is a fragmentary perspective view of the entrance end of an auto conveyor according to the present invention.

Referring to FIG. 2, the framework 24 includes vertical angles 36 supporting a pair of spaced apart large downturned angles 38 defining the upper guide track 26 on which the vehicle tires 14 of one side of the vehicle 14 runs. Side guide rails 40 confine the tires 14, with an ultra high molecular density plastic (UHMW) angle 42 positioned on the outside guide rail to reduce scuffing of the tires 14. Such plastic is of suitable strength and is known to have a self lubricating quality in the presence of water. The intermediate guide track 34 is likewise formed by a pair of spaced apart angles 44, smaller sized, since bearing only the weight of the roller assemblies 16. A pair of upturned guide angles 106 also of UHMW plastic are fastened to the angles 44 serving to guide the ends of the roller assemblies 16 when passed along the intermediate guide track 34, reducing wear and friction and preventing twisting of the chain 18.

The lower guide track 32 is formed by a pair of upturned, spaced apart angles 48, which are inclined downwardly as they approach the entrance end of the conveyor 18 from higher position. This inclination raises the distance of the track above the floor at intermediate points to reduce the dirt accumulation on the chain 18.

The roller assemblies 16 each include a guide-pusher roller combination 50 supported at one end of an elongated roller arm 52 which extends through the slot 53 formed by the spaced apart relationship of the angles 38, to a chain support roller set 54 supported on the other end of the roller arm 52.

The entrance end drum 28 is floatingly supported by a pair of slides 56 comprised of a pair of angles 58 gripping a horizontal member 60 bolted between angles 62 welded to members 36, angles 58 lined with UHMW plastic angles 64 to reduce wear and friction. A heavy compression spring 66 urges the drum 28 out to maintain chain tension while accommodating some in and out movement as the load exerted on the chain 18 varies. The spring force can be varied with a threaded tension rod 65 precompressing the spring 66.

The slot 53 between angles 38 widens to an opening 68 at the point of controlled entrance of the pusher-support roller set 50, opening 68 normally overlain by a trap door 70 hinged by being connected with screws 71 to a rubber sheet 72 clamped to the upper angles 38 by a bar 74 and screws 75. The rubber sheet 72 also acts as a sound deadener as the trap door 68 closes.

Each guide-support roller set 50 is controlled as it approaches the opening 68 to either be elevated to run atop the angles 38 and engage a tire 14, or to pass beneath the angles 38 in the non-engaging position on chain 18 This control is exercised by selectively positioning a pair of laterally spaced ramp members 76 attached to a pivotally mounted cross shaft 78 in either a raised or lowered condition.

Figure 4:
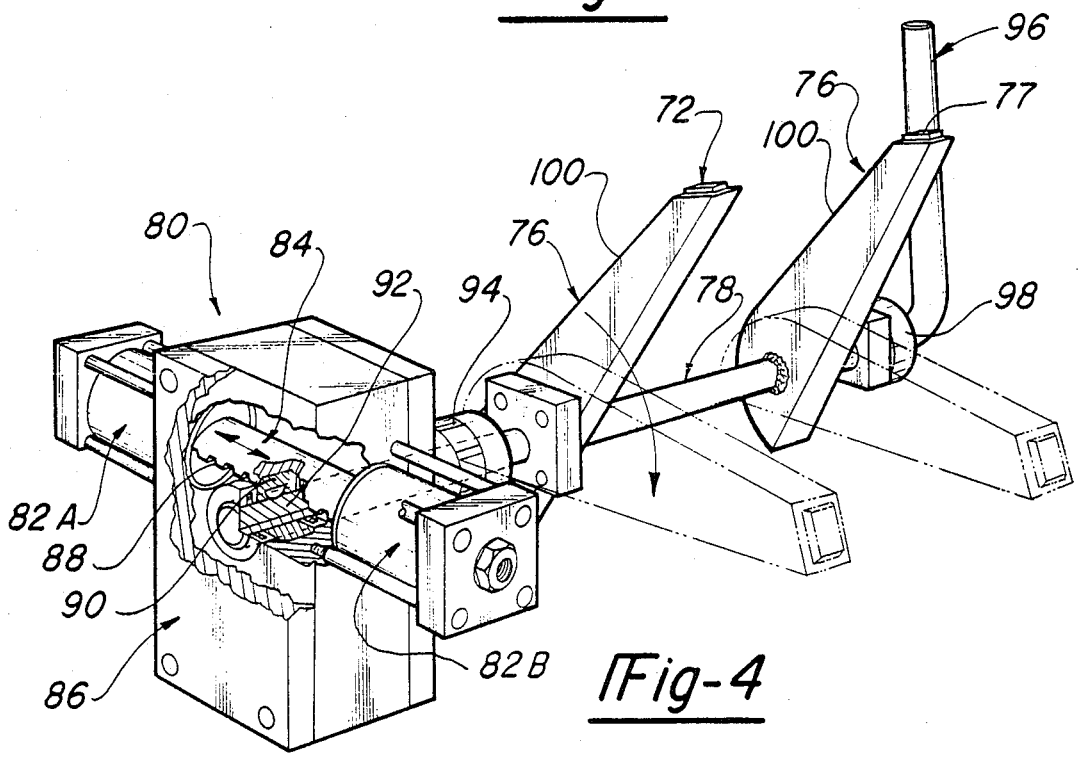
FIG. 4 is a perspective view of the ramp assembly including the ramp actuator, shown partially broken away.

As seen in FIG. 4, the ramp members 76 are positionable in either an upwardly inclined, raised position or a generally horizontal down position, shown in phantom, by rotation of the cross shaft 78.

The cross shaft 78 is rotated by a directly coupled drive means comprised of a rotary actuator 80, including a pair of opposing power cylinders 82A, 82B jointly connected to a common operating shaft 84, all mounted to a housing 86. A gear rack 88 is formed into shaft 84 which is in engagement with a pinion gear 90 keyed to an output shaft 92. Output shaft 92 is connected via shaft coupling 94 to cross shaft 78. Upon actuation of a respective cylinder 82A, 82B the cross shaft 78 and ramp members 76 are actuated to move to either the raised or lowered position.

Such linear to rotary power cylinder actuators are commercially available and hence a description in great detail is not here included. Suitable actuators are available under the "Speed Aire" trademark from Dayton Electric Manufacturing Co., Chicago, Ill., Models 2A 117 to 2A 125.

Alternatively, the ramp members 76 may be manually actuated by means of a handle 96 attached via coupling 98.

Cushioning pieces of rubber 77 are secured with screws to the upper surface of each ramp member 76, engaging the underside of angles 38 to, quiet the contact therewith in moving to the raised position.

Figure 3:
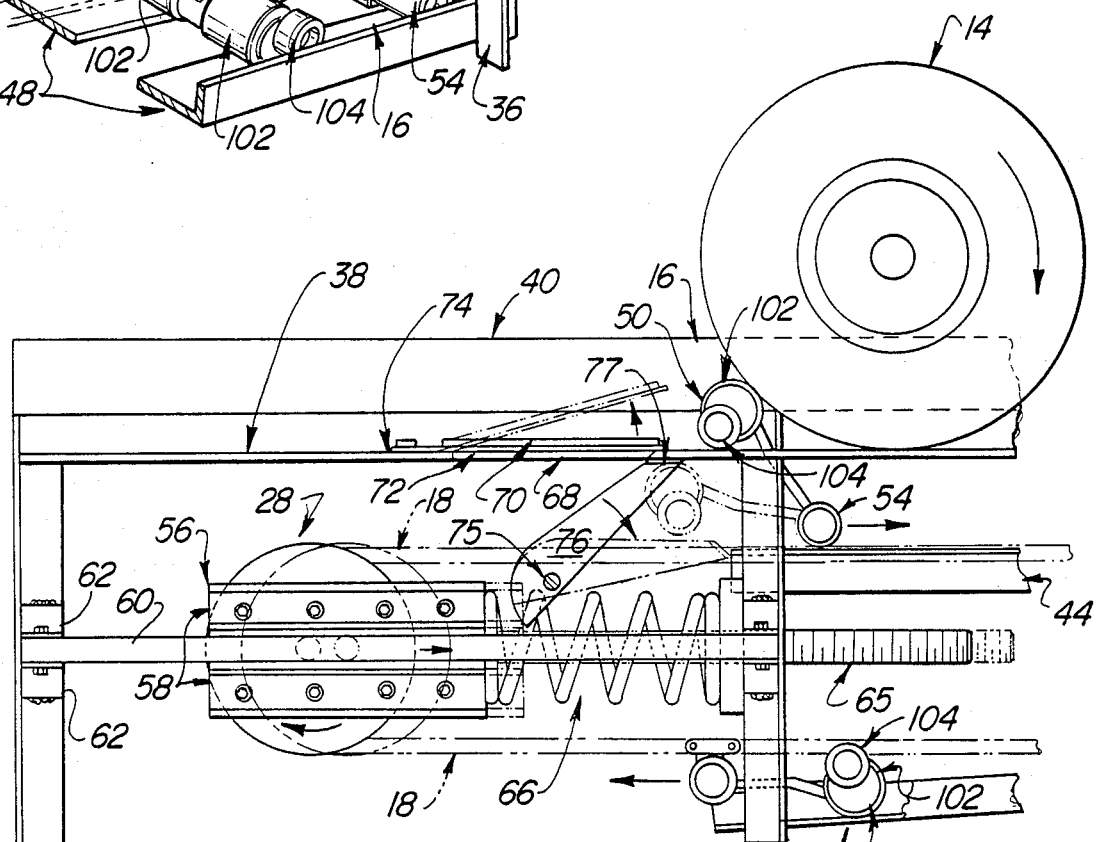
FIG. 3 is a side elevational view of the entrance end portion of the conveyor shown in FIG. 1, taken from the opposite side as in FIG. 1.

The ramp members 76 each have a contoured surface 100 which extend to cause each of the pusher rollers 102, included in each roller set 50, to ride up through the opening 68, engaging the underside of trap door 66, forcing it open and allowing the pusher-guide roller set 50 to exit onto the top of angles 38 as shown in FIG. 2. The guide rollers 104 thereafter run atop the angles 38 as shown in FIG. 3.

If the ramp members 76 are in the lowered position, the guide rollers 104 merely continue to run along the intermediate level track 34. The track angles 44 are overlain with the UHMW plastic angles 106 which serve to cushion and guiet the movement, but primarily provide a close guidance of the ends of guide rollers 104 to keep the chain 18 centered and wandering is avoided.

Figure 7:
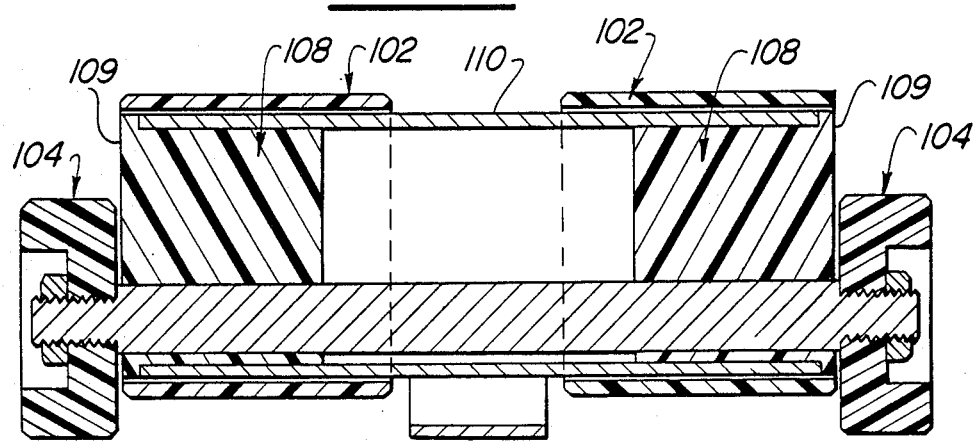
FIG. 7 is a sectional view taken through the roller assembly shown in FIG. 5 along the line 7—7.
Figure 5:
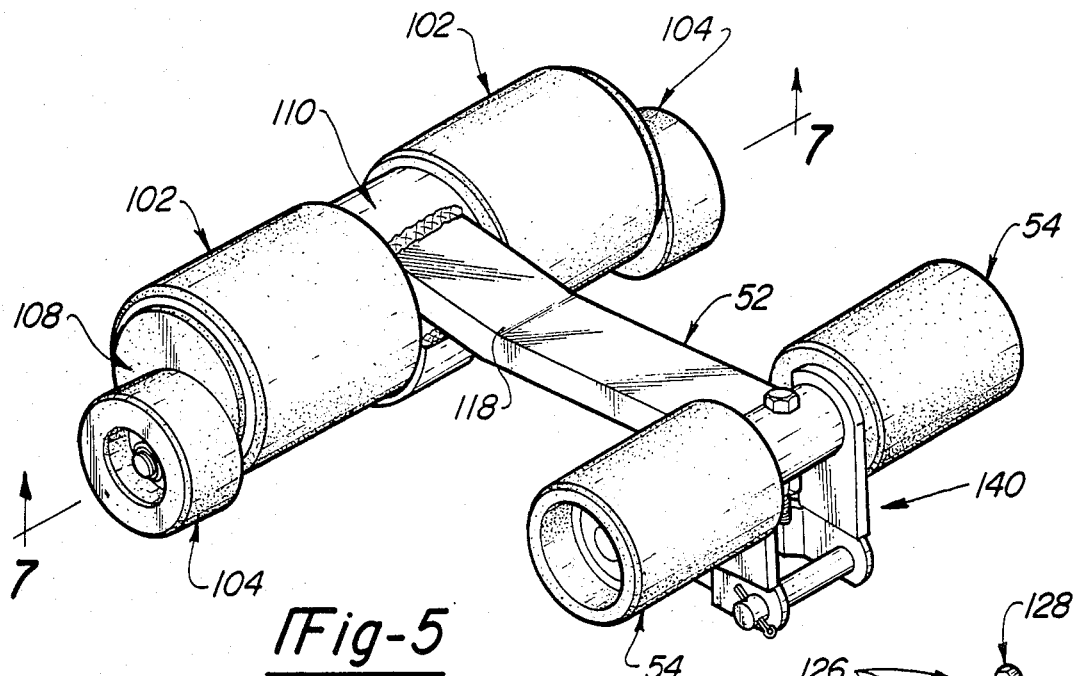
FIG. 5 is a perspective view of the roller assembly incorporated in the auto conveyor according to the present invention.
Figure 6:
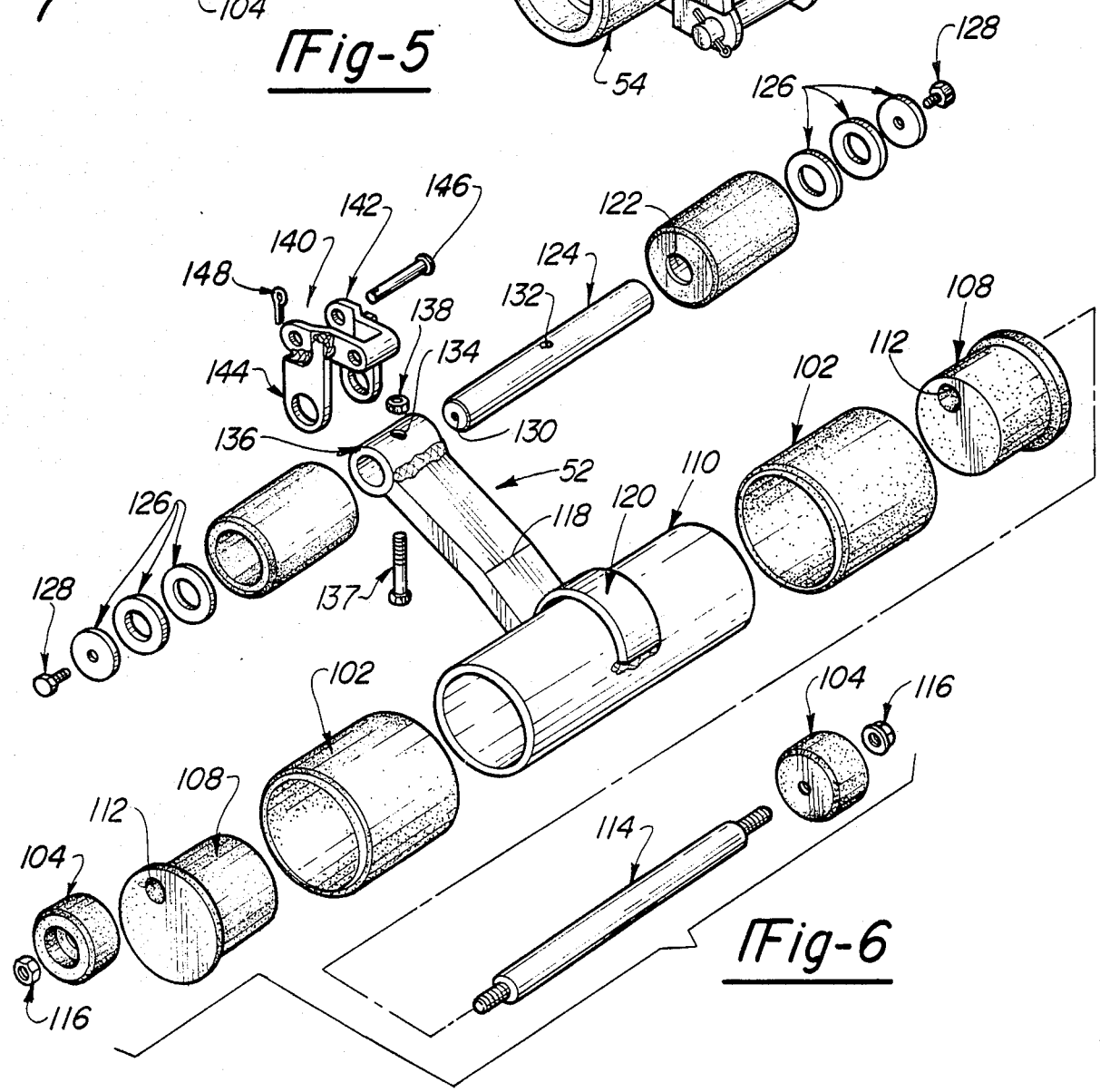
FIG. 6 is an exploded perspective view of the roller assembly shown in FIG. 3.

Referring to FIGS. 5-7, the details of construction of each of the roller assemblies 16 may be understood. The guide-pusher roller sets 50 comprises pairs of large diameter pusher rollers 102 rotatably mounted adjacent the sides of one end of the roller arm 52. The smaller diameter guide rollers 104 are each rotatably mounted outboard of a respective pusher roller 102.

The respective axes of rotation of each of the pusher rollers 102 and guide rollers 104 are parallel, but eccentric to each other, while the axis of rotation of guide rollers 104 passes within the perimeter of the large diameter pusher rollers 102.

The diameter of the guide rollers 104, while relatively smaller, is such as to protrude outside the perimeter of the pusher rollers 102, enabling the guide rollers 104 to support the pusher rollers 102 above the surface of the guide track angles 38, while allowing the assembly 50 to be of low profile as compared to the stacked rollers of the prior art This relationship of the respective axes of rotation is made possible by a stationary bushing 108 received in either end of a sleeve 110 fixed to the roller arm 52 so as to be stationary and extend transversely thereto. A flange 109 formed on each bushing 108 seats against a respective end of the sleeve 110. Pusher rollers 102 comprise UHMW plastic sleeves fit over the O.D. of the sleeve 110 so as to rotate freely thereon.

Each of the bushings 108 is formed with a through bore 112 extending axially within the perimeter of the bushing 108 (and roller 102), bores 112 receiving an axle shaft 114 supporting the guide rollers 104 for rotation thereon. The ends of the axle shaft 114 are threaded to receive locknuts 116, retaining the UHMW plastic cylinders comprising the guide rollers 104. Thus the guide rollers 104 can be removed easily, as can the pusher rollers 102 without removal of the arm 52 from the chain 18.

The roller arm 52 is angled rearwardly at 118 away to move that portion of the roller arm 52 approaching the vehicle tire 14 away therefrom to minimize the chance of tire contact therewith.

The opposite side of the sleeve 110 is provided with an arcuate deflector 120 welded thereto. Tis keeps the chain 18 from running between or on the pusher rollers 102 when the roller assembly is running on the return track.

The support rollers 54 comprise UHMW cylinders formed at one end with a bore 122 receiving one end of an axle rod 124. At the other end of each roller 102, a counterbore accommodating thrust washer set 126 retained by bolt 128 received in threaded hole 130 extending into each end of the axle rod 124.

A cross bore 132 extends through axle rod 124 and is aligned with a cross bore 134 in a support tube 136 welded to the lower end of roller arm 52. Support tube 136 receives axle rod 124, which is retained thereon by bolt 137 and nut 138.

A keeper assembly 140 enables securement to the chain 18, including a link 142 welded to tabs 144 received over axle rod 124. A pin 146 and retainer 148 secure the keeper assembly 140 to the other links (not shown) in the chain 18.

Accordingly, it will be appreciated by those skilled in the art that the above recited objects of the invention are accomplished by the apparatus disclosed herein.

The use of an eccentric axis pusher-guide roller set alleviates the problems of the prior art. The low profile, large diameter roller set avoids entanglements with tire washer brushes, while at the same time the large diameter pusher roller combined with the small diameter outboard guide rollers eliminates the possibility of simultaneous tire contact with the guide and pusher rollers, or any tendency for the pusher roller to pass beneath the tires. The low rate of rotation minimizes wear of pusher roller, and scrubbing wear of the rollers or track is eliminated. The angled roller arm also prevents contact of that member with the tire, while the chain guard prevents chain wear on the rollers.

The rearward center of gravity of the pusher-guide roller set eliminates the incidence of flip over catapulting of the roller assembly, insuring smooth running of the conveyor and eliminating any tendency for the tire to be under run by the pusher rollers and escape the conveyor.

The direct drive of the ramp member shaft eliminates looseness and failure of that mechanism, while the use of the liner angles on the intermediate track insures smooth tracking of the roller assemblies when running in the non-engaging position.

I claim:

1. In a vehicle conveyor of the type including a guide track on which tires of vehicles to be conveyed roll, and an endless chain, powered to be circulated along said guide track, on which chain are mounted a spaced series of roller arms each carrying a roller assembly, each of said roller assemblies including a pair of pusher rollers in a set configured to engage and push a tire of said vehicle to push said vehicle along said guide track, and a pair of guide roller in a set adapted to run on said guide track to guide and support said pusher roller set for movement along and above said guide track as said endless chain circulates, the improvement comprising:

a stationary structure fixed to one end of said roller arm, having a side portion extending from either side of said roller arm, one of said pair of pusher roller comprises a sleeve mounted for rotation on a respective portion of said stationary structure on either side of said roller arm;

means mounting each of said pair of guide rollers on a respective side portion of said stationary structure for rotation about an axis parallel to the axis of rotation of said pusher rollers but lying within the perimeter of said respective pusher roller sleeves; said guide rollers of a diameter smaller than said pusher roller sleeves but sized such as to protrude below the perimeter of a respective one of said pusher roller sleeves, whereby said guide rollers support said pusher rollers above said guide track.

2. The conveyor according to claim 1 wherein said stationary structure comprises a sleeve affixed to the upper end of said roller arm to extend transversely thereto, with either end lying on a respective side of said roller arm.

3. The conveyor according to claim 2 wherein said means supporting said guide rollers comprise a pair of bushings, each received in one end of said sleeve, and an axle shaft passing through both of said bushings and having a respective one of said guide rollers supported on either end thereof.

4. The conveyor according to claim 3 wherein said pusher rollers comprise sleeves of UHMW plastic.

5. The conveyor according to claim 1 wherein said roller arm is angled away from the point whereat said pusher rollers contacts said vehicle tire.

6. The conveyor according to claim 5 further including an arcuate deflector fixed on said roller arm on the reverse side thereof to prevent contact of said chain with said pusher roller.

7. The conveyor according to claim 1 further including means for circulating said roller assemblies on said guide track in either of two positions, a non-e gaging position with said guide-pusher rollers beneath said guide track and an engaging position with said guide pusher rollers atop said guide track; and means for selectively diverting said guide-pusher rollers up onto said guide track, said means including a ramp member adapted to be engaged by said guide-pusher rollers said ramp member in a raised position adapted to elevate said guide-pusher rollers said means further including a pivot shaft connected to said ramp member and a rotary actuator directly coupled to said shaft.

8. The conveyor according to claim 7 further, including an intermediate guide track below said first mentioned guide track along which said guide-pusher rollers move when in said non-engaging position, said intermediate guide track comprised of spaced apart steel angles and line angles of plastic providing guidance for the ends of said guide rollers.

9. The conveyor according to claim 3 wherein said axle shaft has threaded ends and wherein said guide rollers are retained thereon by a nut on each threaded end, whereby said axle shaft is readily removable.

10. The conveyor according to claim 3 wherein said bushing is formed of a plastic bearing material.

11. A roller assembly, including:
a roller arm;
a pair of pusher rollers mounted in a side by side set on one end said roller arm;
a pair of guide rollers mounted in a set one outboard a respective pusher roller;
said pusher rollers each comprising relatively large diameter sleeves;
stationary structure having opposite portions extending on either side of said one end of said roller arm, one of said pair of pusher roller sleeves mounted for rotation on opposite portion of said stationary structure located on either side of said roller arm;
means mounting each of said pair of guide rollers on a respective side of said stationary structure for rotation about an axis parallel to the axis of rotation of said pusher rollers but lying within the perimeter of said respective pusher roller sleeves;
said guide rollers of a diameter smaller than said pusher roller sleeves but sized such as to pass beyond the perimeter of a respective one of said pusher roller sleeves, whereby said guide rollers may support said pusher rollers above a supporting surface.

12. The roller assembly according to claim 11 wherein said stationary structure comprises a sleeve affixed to the upper end of said roller arm with either end located on a respective side of said roller arm.

13. The roller assembly according to claim 2 wherein said means supporting said guide rollers comprise a pair of bushings, each received in one end of said sleeve, and an axle shaft passing through both of said bushings and having a guide roller supported on either end thereof.

14. The roller assembly according to claim 3 wherein said pusher rollers sleeves are of UHMW plastic.

15. The roller assembly according to claim 11 wherein said roller arm is angled at an intermediate location.

16. The roller assembly according to claim 15 further including an arcuate deflector fixed on said roller arm on the reverse side thereof to prevent contact of said chain with said pusher roller.

17. The roller assembly according to claim 13 wherein said axle shaft has threaded ends and wherein said guide rollers are retained thereon by a nut on each threaded end, whereby said axle shaft is readily removable from said roller assembly.

18. The roller assembly according to claim 13 wherein said bushing is formed of a plastic bearing material.

19. The roller assembly according to claim 11 further including a pair of support rollers mounted at the other end of said roller arm for rotation about a common axis parallel to the axis of rotation of said guide and pusher rollers.

20. The roller assembly according to claim 19 further including a detachable attachment means for connecting said other end of said roller arm to a chain.

* * * * *